United States Patent [19]

Hong

[11] Patent Number: 5,386,236
[45] Date of Patent: Jan. 31, 1995

[54] TELEVISION SCREEN ASPECT RATIO CONVERTING METHOD AND THE DEVICE THEREOF

[75] Inventor: Sung H. Hong, Seoul, Rep. of Korea

[73] Assignee: Goldstar Co., Ltd., Seoul, Rep. of Korea

[21] Appl. No.: 997,231

[22] Filed: Dec. 28, 1992

[30] Foreign Application Priority Data

Dec. 28, 1991 [KR] Rep. of Korea ............... 91-24816

[51] Int. Cl.$^6$ ..................... H04N 7/01; H04N 5/46
[52] U.S. Cl. ............................... 348/445; 348/432; 348/458; 348/556; 348/913
[58] Field of Search ............... 358/140, 180, 11, 230, 358/56, 141, 12, 188; H04N 7/01, 5/46, 7/00; 348/445, 441, 443, 448, 449, 450, 451, 452, 458, 426, 432, 429, 439, 469, 470, 473, 474, 556, 557, 555, 704, 913, 903

[56] References Cited

U.S. PATENT DOCUMENTS

| | | | |
|---|---|---|---|
| 4,622,577 | 11/1986 | Reitmeier et al. | 358/11 |
| 4,703,353 | 10/1987 | David | 358/140 |
| 5,132,793 | 7/1992 | Hirahata et al. | 358/140 |
| 5,134,479 | 7/1992 | Ohishi | 358/140 |
| 5,136,398 | 8/1992 | Rodriguez-Cavazos et al. | 358/180 X |
| 5,159,438 | 10/1992 | Rabii | 358/180 X |

FOREIGN PATENT DOCUMENTS

| | | | |
|---|---|---|---|
| 0162501 | 11/1985 | European Pat. Off. | H04N 5/262 |
| 0374715 | 12/1989 | European Pat. Off. | H04N 7/00 |
| 0434301 | 6/1991 | European Pat. Off. | H04N 7/00 |
| 0514819 | 11/1992 | European Pat. Off. | H04N 5/262 |
| 60-165883 | 8/1985 | Japan | H04N 7/01 |
| 2251755 | 7/1992 | United Kingdom | H04N 7/01 |

OTHER PUBLICATIONS

"NTSC-HDTV Up-converter", Signal Processing of HDTV, II, Elsevier Science Publishers, B.V. 1990, pp. 665-673.

"Better Video Images", SMPTE, 23rd Annual SMPTE Television Conference in San Francisco, 1989, 201-216.

"Conference and Exhibition on Television Techniques", Scientific Society for Telecommunication, The Budapest Regional Society of the MTESZ, 12-14, Jun., 1990, vol. II, pp. 56-62.

Primary Examiner—Victor R. Kostak
Assistant Examiner—Safet Metjahic
Attorney, Agent, or Firm—Poms, Smith, Lande & Rose

[57] ABSTRACT

A television screen aspect ratio converting method and the device thereof which is suitable to display a video signal having a 4:3 screen aspect ratio on a screen having a 16:9 aspect ratio. According to the present invention, scanning lines amounting to 30 lines or less having unimportant information are removed in a vertical direction from an input video signal having a 4:3 screen aspect ratio, vertical interpolation is performed for the removed scanning lines, and then 4/5 time-compression in a horizontal direction is performed, so that the video signal is displayed on a screen having a 16:9 aspect ratio. Accordingly, picture loss in a vertical direction is minimized and the screen expansion in a horizontal direction is within a range such that a general televiewer cannot perceive a variation of image, so that integrity of image to be displayed after the conversion of screen aspect ratio can be maintained as is.

2 Claims, 10 Drawing Sheets

TELEVISION SCREEN ASPECT RATIO CONVERTING METHOD AND THE DEVICE THEREOF

BACKGROUND OF THE INVENTION

The present invention relates to a method and device for converting a screen aspect ratio of a television, and more particularly to a method and device for converting a screen aspect ratio of a television which is suitable for displaying a video signal having a screen aspect ratio of 4:3 through an image device having a screen aspect ratio of 16:9.

Conventionally, when a video signal having a screen aspect ratio of 4:3 is displayed in an image device having a screen aspect ratio of 16:9, a quarter of the scanning lines are removed in the vertical direction, or, the video signal is displayed without any processing, as is. However, in the former, much picture information is lost, and in the latter, the image is distorted by expansion in the horizontal direction.

Figure 1A:
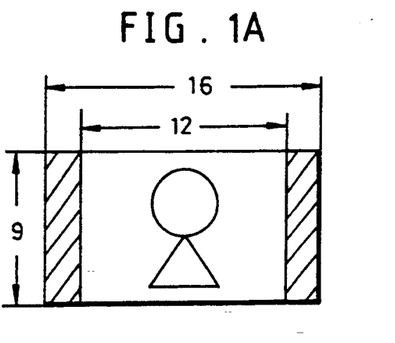
FIGS. 1A to 1C illustrate screen display states according to conventional screen aspect ratio conversion.
Figure 1B:
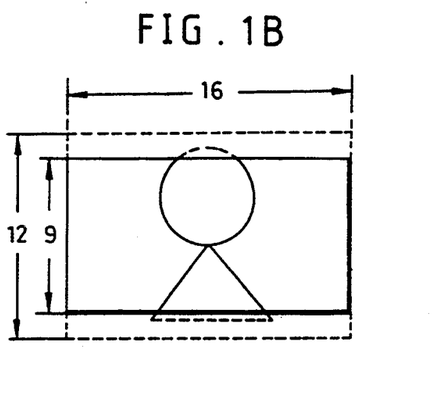
Figure 1C:
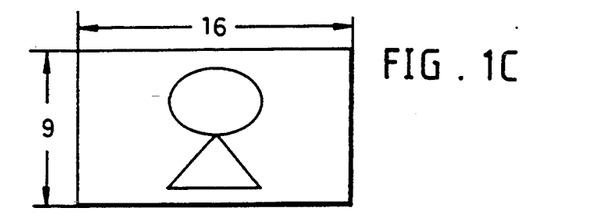

FIGS. 1A to 1C show that pictures are displayed by the conventional screen aspect ratio converting modes.

That is, one of the conventional modes (i.e., a normal mode) uses only the central three-quarters portion (or four-fifths) of a screen having an aspect ratio of 16:9 (or 5:3) and leaves right and left side panels (shaded portion) as blank space, as shown in FIG. 1A.

Figure 2:
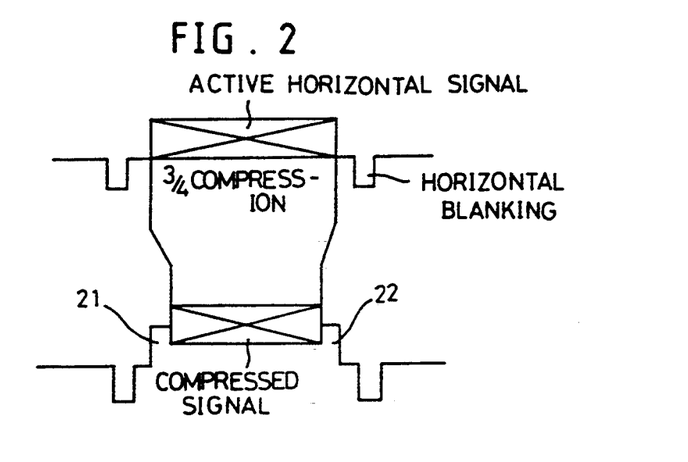
FIGS. 2 and 3 are views explaining the conventional screen aspect ratio converting methods of FIGS. 1A and 1B.

In this mode, as shown in FIG. 2, time-compression is performed in a horizontal direction of screen (time-compression of ¾ is performed in conversion into a 16:9 screen aspect ratio and time-compression of 4/5 is performed in conversion into a 5:3 screen aspect ratio), and the remaining ¼ (or 1/5) horizontal interval corresponds to the blank side panels 21 and 22. At this time, the horizontal scanning interval of the video signal having a 4:3 screen aspect ratio is the same as that of the video signal having a 16:9 screen aspect ratio (in case of NTSC type, about 63.5 μsec).

However, in this case, since a quarter (or a fifth) of the screen having an aspect ratio of 16:9 (or 15:9) is used as panels, presence of image is reduced.

FIG. 1B shows a picture displayed by another one of the conventional modes (i.e., zoom mode), which uses only ¾ (or 4/5) of the overall scanning lines of an image having a 4:3 screen aspect ratio, and performs interpolation in a vertical direction, and then displays a image on a screen having a 16:9 (or 5:3) aspect ratio.

Figure 3:
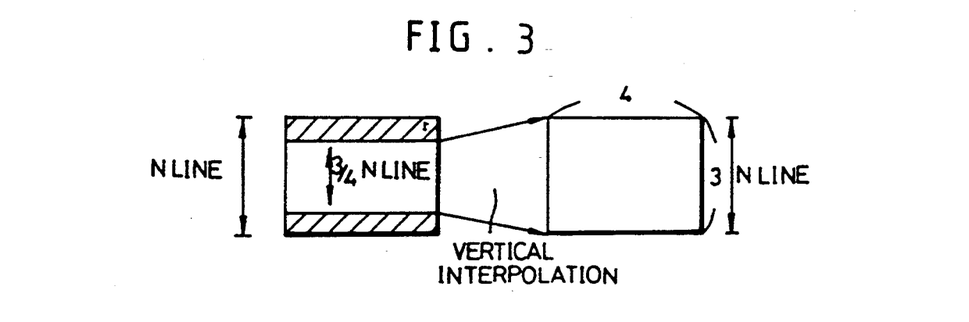

In this mode, as shown in FIG. 3, when the video signal having a screen aspect ratio of 4:3 is converted into that of 16:9, only (¾)N of all the scanning lines N are taken, and then are interpolated by 4:3 in a vertical direction, thereby scanning the image on the screen having an aspect ratio of 16:9.

Accordingly, in this mode, during conversion into the screen aspect ratio of 16:9, picture information corresponding to a quarter of all the picture information is lost (for instance, in case of NTSC type, 120 lines are removed from the active scanning lines, i.e., about 480 lines). And, during conversion into the screen aspect ratio of 5:3, a fifth of the picture information is lost (for instance, in case of NTSC type, 96 lines are removed from the active scanning lines, i.e., about 480 lines).

Meanwhile, another conventional mode (default mode) displays an image having a screen aspect ratio of 4:3 on a screen of 16:9 (or 15:9) without any extra processing, as shown in FIG. 1C. In this mode, since the picture is expanded by 4/3 times (or 5/4 times) in a horizontal direction, the converted image is widened by 33.3% (or 25%) in a horizontal direction with respect to the original form.

SUMMARY OF THE INVENTION

It is an object of the present invention to solve such conventional problems, and to provide a television screen aspect ratio converting method and the device thereof, which removes unimportant image information in a horizontal direction from a video signal having a screen aspect ratio of 4:3 and performs time-compression in a horizontal direction, and then displays the video signal on the screen having an aspect ratio of 16:9, thereby reducing expansion in the horizontal direction, and maintaining integrity of the image, when the video signal having a screen aspect ratio of 4:3 is displayed on a screen having a screen aspect ratio of 16:9.

To achieve the object, the present invention provides a television screen aspect ratio converting method which comprises the steps of:
 removing a predetermined number of upper and lower scanning lines having unimportant information in a vertical direction from a video signal having a screen aspect ratio of 4:3;
 performing vertical interpolation by the removed scanning lines to restore an original number of scanning lines; and
 performing time-compression of a predetermined rate in a horizontal direction and displaying a video signal on a screen having a screen aspect ratio of 16:9 by assigning a position of the compressed image.

Also, to achieve the object, the present invention comprises:
 window means for receiving horizontal and vertical sync signals separated from a video signal, extracting a predetermined number of lines to be displayed on a screen having an aspect ratio of 16:9 from a vertically interpolated signal, and controlling an image having a screen aspect ratio of 5:3 to be positioned in the middle of a screen;
 vertical interpolation means for vertically interpolating an input video signal having a screen aspect ratio of 4:3 by a predetermined ratio; and
 buffer means for compressing by a predetermined time rate an input video signal vertically interpolated by the vertical interpolation means, and outputting the interpolated video signal in response to a control signal outputted from the window means.

BRIEF DESCRIPTION OF THE DRAWINGS

The above object and other advantages of the present invention will become more apparent by describing the preferred embodiments of the present invention with reference to the attached drawings, in which.

DETAILED DESCRIPTION OF THE INVENTION

For a current television video signal, particularly an NTSC type broadcasting signal, the top and bottom image portions of a screen, i.e., upper and lower 15 to 20 scanning lines among the 525 scanning lines, have insignificant information. Also, a general televiewer rarely recognizes a variation of image when the horizontal expansion of an image is in the range of 10 to 13%.

According to the invention, both top and bottom image portions having insignificant information are removed, and the image to be displayed on a 16:9 screen is distorted (i.e., expanded) in the horizontal direction to such a degree that a general televiewer would rarely recognize such distortion of image, while having a small-sized said panel on both sides of the 16:9 screen.

Figure 4:
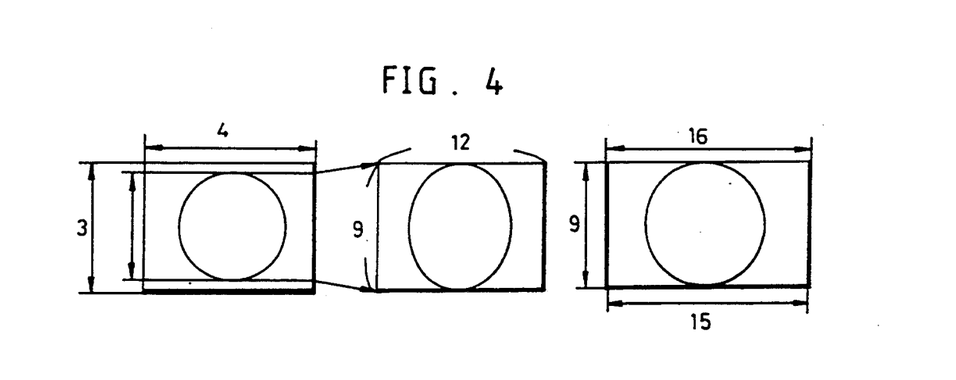
FIG. 4 illustrates a screen processing state under the present converting method.

FIG. 4 shows a screen processing state under the present screen aspect ratio converting method, where the aforementioned screen display characteristic is considered when a video signal having a 4:3 screen aspect ratio is displayed on a screen having a 16:9 screen aspect ratio. That is, in an image having a 4:3 screen aspect ratio, a total of 30 lines or less are removed from the upper and lower scanning lines, and vertical interpolation with respect to the removed scanning lines is performed. Then, the image is time-compressed by a 4/5 rate and displayed on a screen having a 16:9 screen aspect ratio by assigning the position of the compressed image.

As an embodiment of the above-mentioned display method according to the present invention, there is a method for interpolating 525 scanning lines by a ratio of 7:8 to make 600 lines and then displaying only 450 active lines on a 16:9 screen, where the number of removed active scanning lines comprises the top and bottom 75 lines and the horizontal expansion of image becomes 9.375%.

As another embodiment of the display method according to the present invention, there is a method for making about 573 lines by interpolating 525 scanning lines in a ratio of 11:12 and then displaying only 525 scanning lines on a 16:9 screen, where the removed active scanning lines are the top and bottom 20 lines, and the horizontal expansion of image becomes 14.5%.

Figure 5:
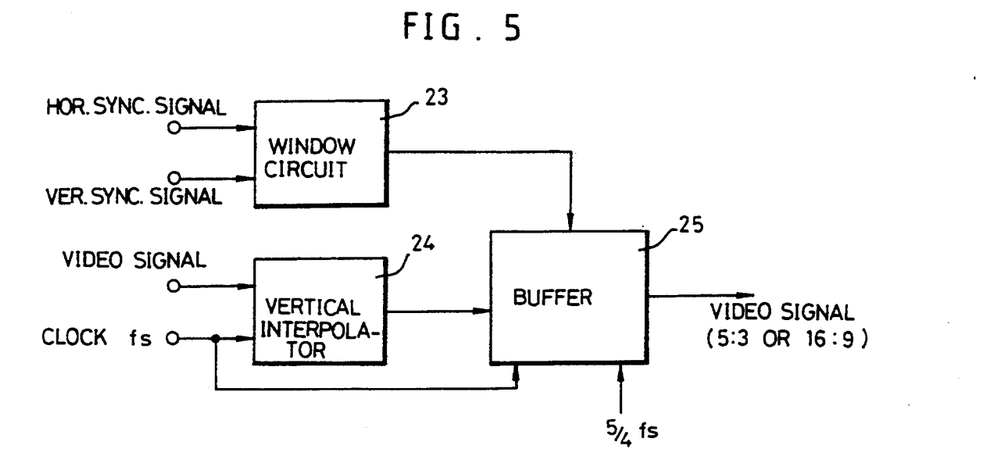
FIG. 5 is a schematic block diagram of a screen aspect ratio converting device according to the present invention.

FIG. 5 is a block diagram of a screen aspect ratio converting device according to the present invention, which comprises a window circuit 23 for receiving horizontal and vertical sync signals, extracting 480 lines to be displayed on a screen having a 16:9 aspect ratio from a vertically interpolated signal, and outputting a control signal for positioning an image having a 5:3 screen aspect ratio in the middle of a 16:9 screen, a vertical interpolator 24 for receiving a video signal having a 4:3 screen aspect ratio and a clock signal, and outputting an interpolated signal obtained by vertically interpolating by a proper ratio an input video signal having a 4:3 screen aspect ratio, and a buffer 25 for time-compressing by a 4/5 rate the input signal vertically interpolated by the vertical interpolator 24, using a line memory, and then outputting a compressed video signal according to a control signal outputted in the window circuit 23.

Figure 6:
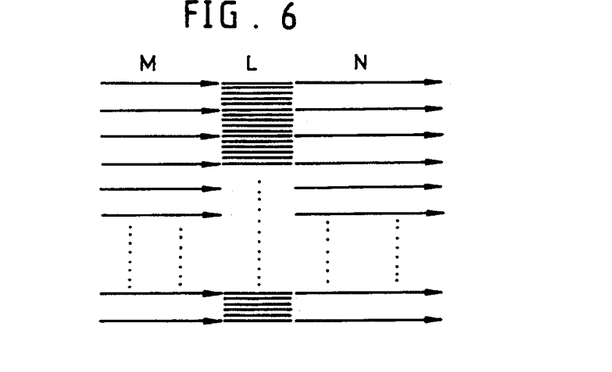
FIG. 6 is a view explaining the principle of vertical interpolations according to the present invention.

FIG. 6 is to explain the vertical interpolation principle applied in the present invention having the above construction, where when N scanning lines are made using M scanning lines, L scanning lines corresponding to the least common multiple of M and N are made, and N scanning lines are extracted from the L scanning lines.

Table 1 shows an equation for making 8 scanning lines from 7 scanning lines according to the interpolation principle shown in FIG. 6, where a sampling rate of input signal is increased to a rate of 8, and low-pass filtering by 1/7 is performed, and then the sampling rate is reduced by 7 times.

TABLE 1

$y[l] = \sum_{n=-\infty}^{\infty} h_{(7l-8n)}x[n]$ (Eq. 1)

$y[0] = h_{16}x[-2] + h_8x[-1] + h_0x[0] + h_8x[1] + h_{16}x[2]$ (Eq. 2)

$y[1] = h_{15}x[-1] + h_7x[0] + h_1x[1] + h_9x[2] + h_{17}x[3]$ $y[2] = h_{14}x[0] + h_6x[1] + h_2x[2] + h_{10}x[3] + h_{18}x[4]$ $y[3] = h_{13}x[1] + h_5x[2] + h_3x[3] + h_{11}x[4] + h_{19}x[5]$ $y[4] = h_{12}x[2] + h_4x[3] + h_4x[4] + h_{12}x[5] + h_{20}x[6]$ $y[5] = h_{19}x[2] + h_{11}x[3] + h_3x[4] + h_5x[5] + h_{13}x[6]$ $y[6] = h_{18}x[3] + h_{10}x[4] + h_2x[5] + h_6x[6] + h_{14}x[7]$ $y[7] = h_{17}x[4] + h_9x[5] + h_1x[6] + h_7x[7] + h_{15}x[8]$ $y[8] = h_{16}x[5] + h_8x[6] + h_0x[7] + h_8x[8] + h_{16}x[9]$

In the above low-pass filtering, since there is only one active signal among the up-sampled eight signals, the actual filter processing step is indicated by equation 1.

Also, equation 2 is obtained by calculating equation 1 when the filter is set by a symmetric filter and five input signals are used, and it is known in equation 2 that a set of filter coefficients applied to the input signals is repeated by a period of eight output signals.

Table 2 shows that 12 scanning lines are obtained from 11 input scanning lines, where it is known from equation 4 that a set of filter coefficients is repeated by a period of 12 output signals.

TABLE 2

$y[l] = \sum_{n=-\infty}^{\infty} h_{(11l-12n)}x[n]$ (Eq. 3)

(Eq. 4)

$y[0] = h_{24}x[-2] + h_{12}x[-1] + h_0x[0] + h_{12}x[1] + h_{24}x[2]$ $y[1] = h_{23}x[-1] + h_{11}x[0] + h_1x[1] + h_{13}x[2] + h_{25}x[3]$ $y[2] = h_{22}x[0] + h_{10}x[1] + h_2x[2] + h_{14}x[3] + h_{26}x[4]$ $y[3] = h_{21}x[1] + h_9x[2] + h_3x[3] + h_{15}x[4] + h_{27}x[5]$

Figure 7:
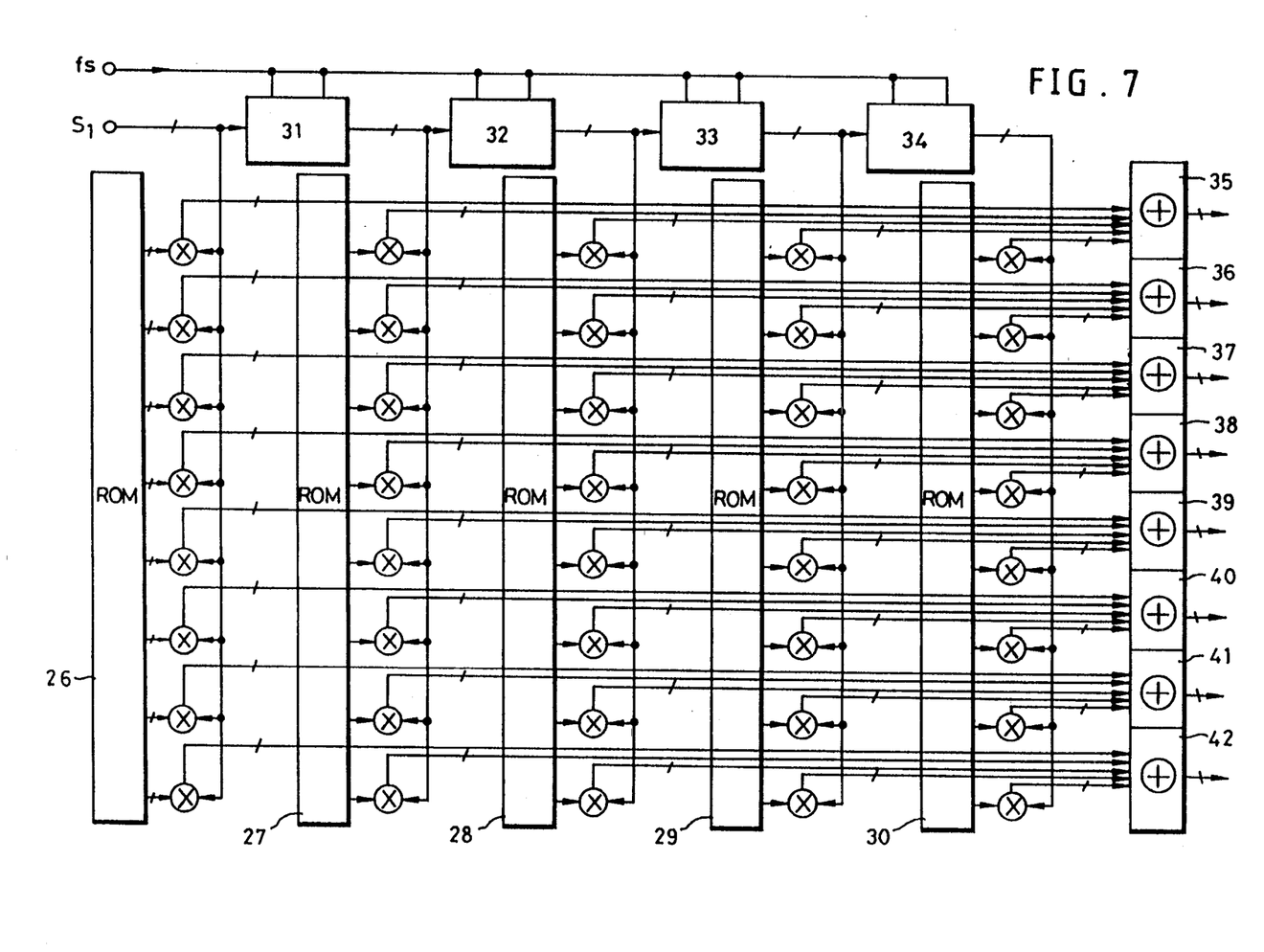
FIG. 7 is a circuit diagram showing an embodiment of the interpolator shown in FIG. 5.

TABLE 2-continued $y[4] = h_{20}x[2] + h_8x[3] + h_4x[4] + h_{16}x[5] + h_{28}x[6]$ $y[5] = h_{19}x[2] + h_7x[3] + h_5x[4] + h_{17}x[5] + h_{29}x[6]$ $y[6] = h_{18}x[3] + h_{16}x[4] + h_6x[5] + h_{18}x[6] + h_{30}x[7]$ $y[7] = h_{29}x[4] + h_{17}x[5] + h_5x[6] + h_7x[7] + h_{19}x[8]$ $y[8] = h_{28}x[5] + h_{16}x[6] + h_4x[7] + h_8x[8] + h_{20}x[9]$ $y[9] = h_{27}x[6] + h_{15}x[7] + h_3x[8] + h_9x[9] + h_{21}x[10]$ $y[10] = h_{26}x[7] + h_{14}x[8] + h_2x[9] + h_{10}x[10] + h_{22}x[11]$ $y[11] = h_{25}x[8] + h_{13}x[9] + h_1x[10] + h_{11}x[11] + h_{23}x[12]$ $y[12] = h_{24}x[9] + h_{12}x[10] + h_0x[11] + h_{12}x[12] + h_{24}x[13]$ FIG. 7 shows an embodiment of an interpolator according to the present invention which realizes by a circuit the interpolation step shown in the above table 1. The filter coefficients used in equation 2 are recorded in each of ROMs 26 to 30, and an input signal $S_1$ and signals delayed sequentially by one line through line memories 31 to 34 from the input signal $S_1$ are multiplied by the filter coefficients respectively recorded on ROMs 26 to 30.

At this time, a sampling clock for input signal, i.e. fs is used as read and write clocks of the line memories 31 to 34, and signals multiplied by the respective filter coefficients are summed in adders 35 to 42, which output eight signals, at the same time.

Figure 8:
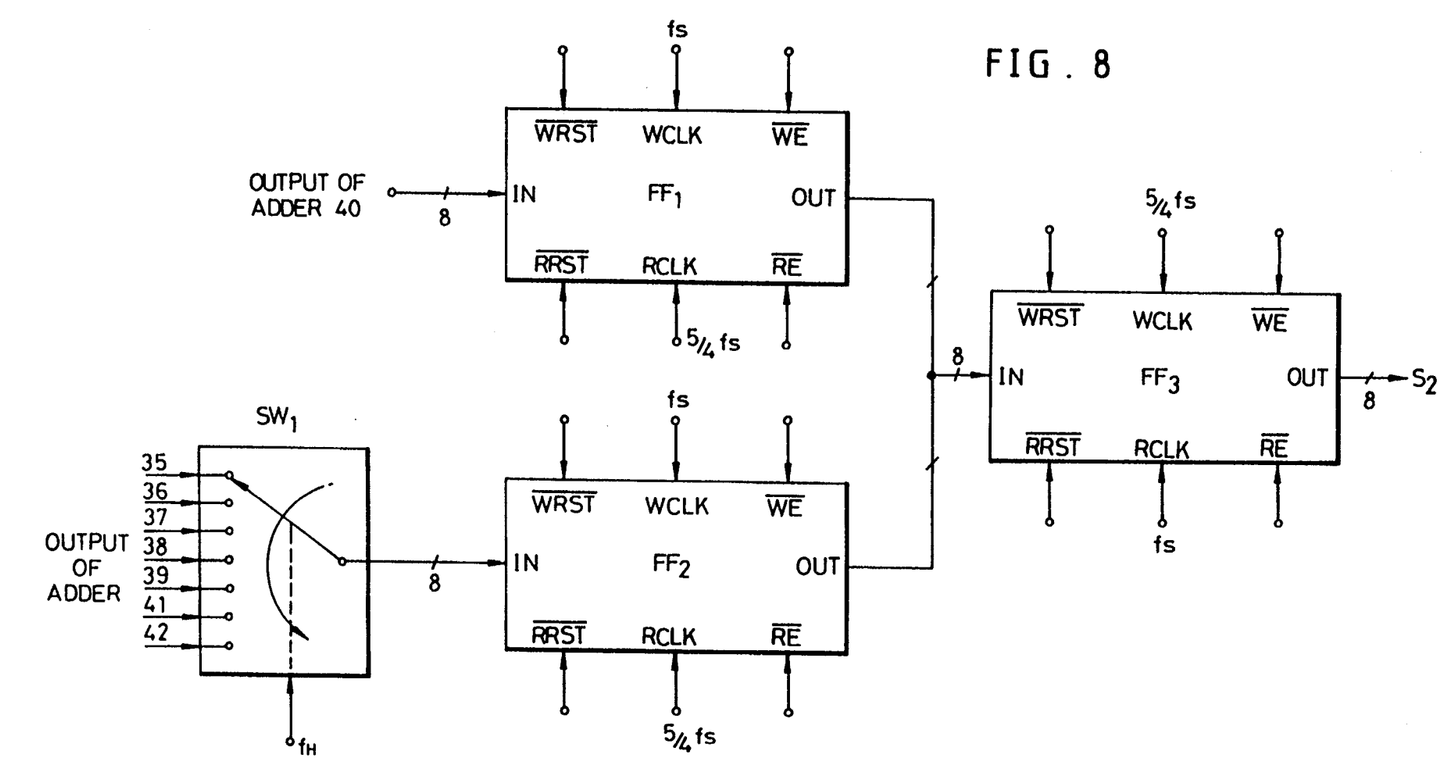
FIG. 8 is a circuit diagram showing an embodiment of the buffer shown in FIG. 5.
Figure 9A:
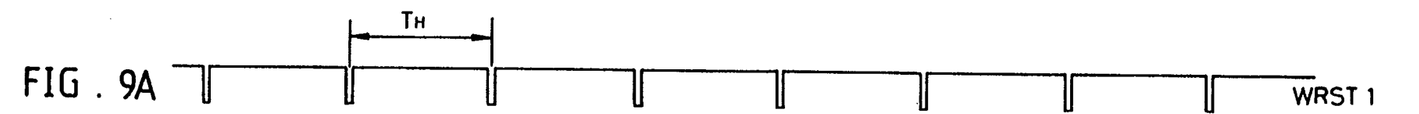
FIG. 9 is a timing chart explaining operation of a line memory shown in FIG. 8.
Figures 9B, 9C, 9D:
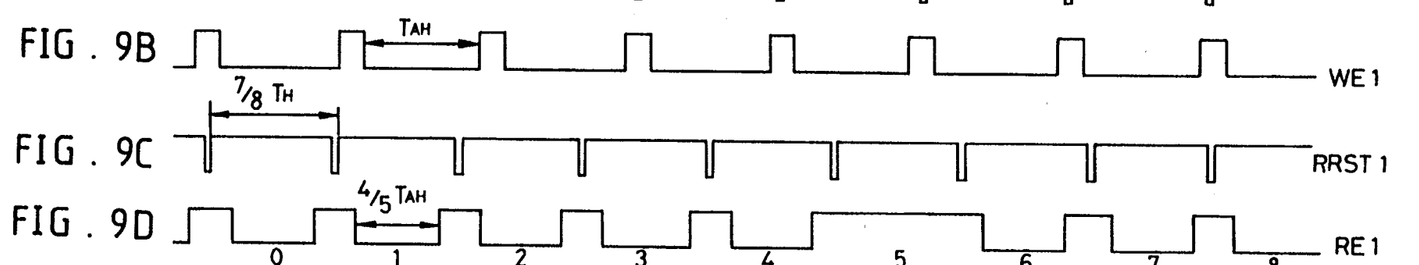

FIG. 8 is a circuit diagram showing an embodiment of the buffer (25 of FIG. 5) corresponding to the interpolator shown in FIG. 7, which comprises a plurality of line memories $FF_1$ and $FF_2$ and a field memory $FF_3$, and a switch $SW_1$ for switching the outputs of the adders 35 to 42 shown in FIG. 7. With reference to FIGS. 9A to 9C, the line memories $FF_1$ and $FF_2$ write-reset by a one-line period signals outputted through the adders 35 to 42 (,as shown in FIG. 9A), and write-enable the signals while the data corresponding to the active horizontal region is written in the line memories $FF_1$ and $FF_2$ (as shown FIG. 9B). At this time, write clocks of two line memories $FF_1$ and $FF_2$ use a sampling clock $f_s$ of input signal.

Hereinafter, a read step of the line memories $FF_1$ and $FF_2$ is described as follows:

That is, since the interpolator shown in FIG. 7 interpolates 8 lines for 7 horizontal scanning intervals $(7 \times T_H)$, a read clock should be faster by 8/7 than a write clock. Accordingly, the read reset, as shown in FIG. 9C, of the line memories $FF_1$ and $FF_2$ is generated by each interval of 7/8 $T_H$, which is faster by 8/7 than that of write reset.

Also, since (8/7) is used as a read clock, the read enable interval should be (7/8) $T_{AH}$ which is faster by than the write enable interval ($T_{AH}$ of FIG. 9B).

The switch $SW_1$ selects output signals (i.e., outputs of the adders 35 to 42) of the interpolator shown in FIG. 7 by switching with a speed of horizontal frequency $f_H$, and the selected signal is written in the line memory $FF_2$ by the same way as in FIGS. 9A and 9B.

Also, an output of the adder 40 which is outputted with an output of the adder 39 at the same time, is written by the same way (shown in FIGS. 9A and 9B) as in the line memory $FF_2$.

Figure 9E:
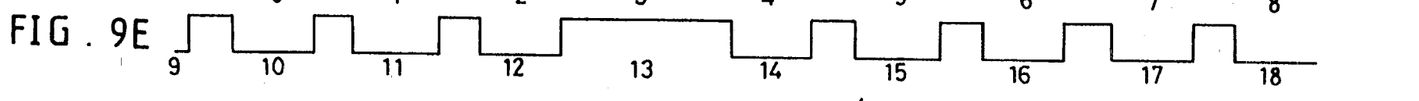
Figure 9F:
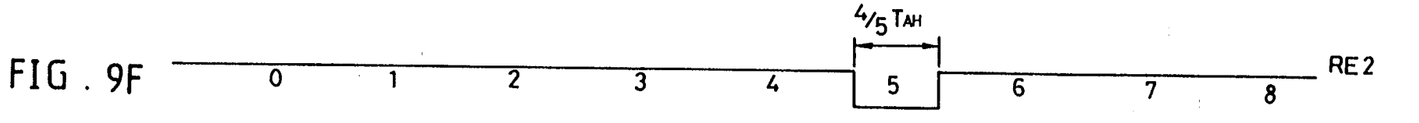
Figure 9G:
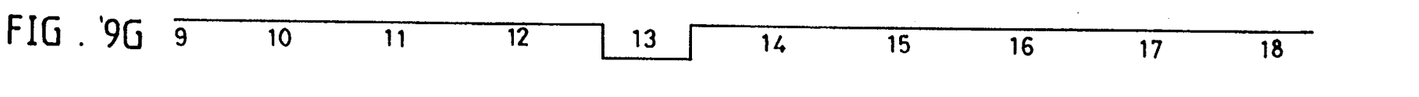

Here, the two line memories $FF_1$ and $FF_2$ are read-reset as shown in FIG. 9C. Between them, the read-enable of line memory $FF_2$ is performed as shown in FIG. 9D and the read-enable of line memory $FF_1$ is performed as shown in FIG. 9E.

Accordingly, even if the write clock of the line memories $FF_1$ and $FF_2$ is the same as the sampling clock $f_s$, and the read clock is $(8/7)f_s$, no collision between the read and written data is generated.

Meanwhile, since the write clock of the field memory $FF_3$ is $(8/7)f_s$ which is the same as the read clock of the line memories $FF_1$ and $FF_2$.

Figure 10A:
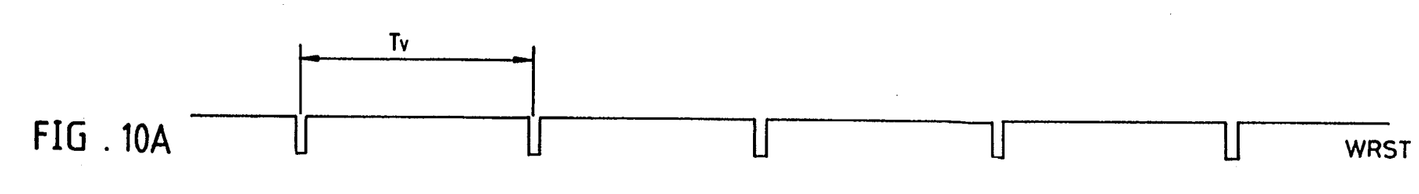
FIG. 10 is a timing chart explaining operation of a field memory shown in FIG. 8.
Figure 10B:
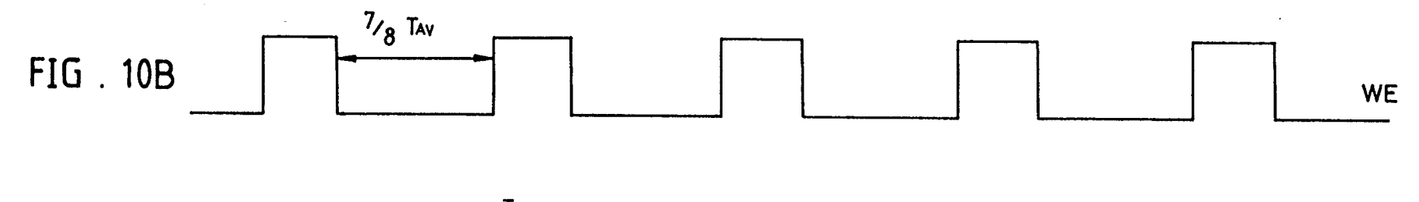

In the writing operation of the field memory $FF_3$, as shown in FIGS. 10A and 10B, a write-reset pulse is generated by each vertical scanning interval $T_v$ (1/60 second in NTSC type), and write enable is performed for approxmately the number of active scanning lines, i.e. 480 lines, interval $(7/8)T_{AV}$.

Figure 10C:
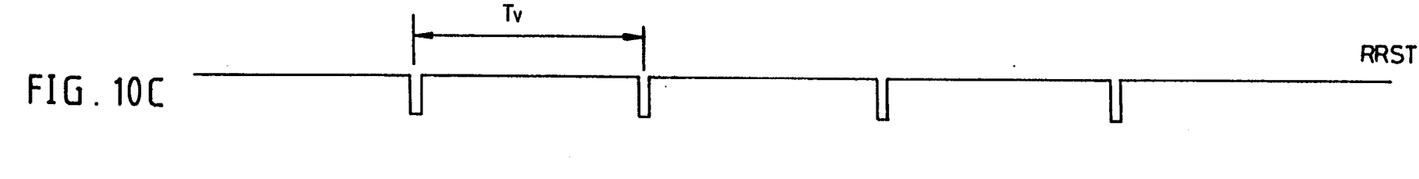
Figure 10D:
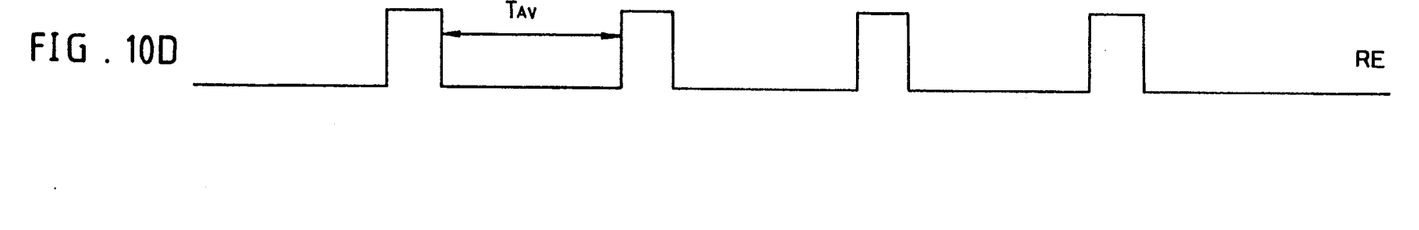

The read-reset such as FIG. 10C is performed by being delayed by $T_v/2$ with respect to a write-reset pulse such as FIG. 10A, and the reading operation is enabled for $T_{AV}$ interval as shown in FIG. 10D.

Accordingly, the output image finally displayed on a screen having a 16:9 screen aspect ratio is horizontally expanded by 9.375%, and has side panels corresponding to 3.125% of the screen's horizontal width on the right and left sides. Also, an image in which about 60 lines are removed from among the 480 active scanning lines of an image having 4:3 screen aspect ratio, is displayed. All control signals shown in FIGS. 9A to 9G and FIGS. 10A to 10D are generated from the window circuit 23 shown in FIG. 5.

Figure 11:
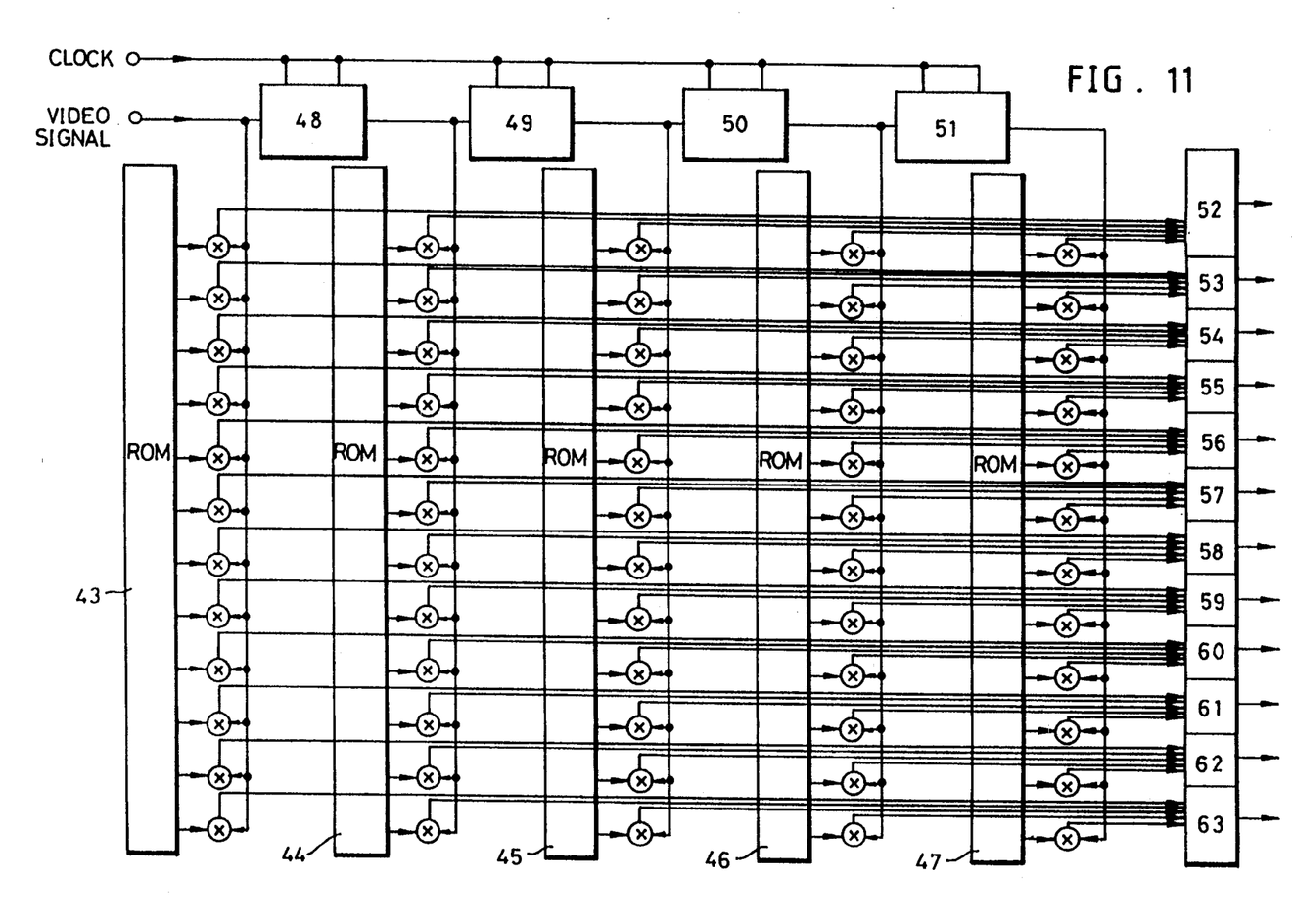
FIG. 11 is a circuit diagram showing another embodiment of the interpolator according to the present invention.

FIG. 11 shows a circuit diagram illustrating another embodiment of the interpolator for performing the interpolation process shown in Table 2. Low-pass filter coefficients used in equation 4 are recorded in ROMs 43 to 47, and an input video signal and delay signals delayed sequentially by one line passing through the line memories 48 to 51 from the input video signal are multiplied by the respective low-pass filter coefficients recorded in ROM 43 to 47, and summed by adders 52 to 63, which output 12 signals at the same time.

Figure 12:
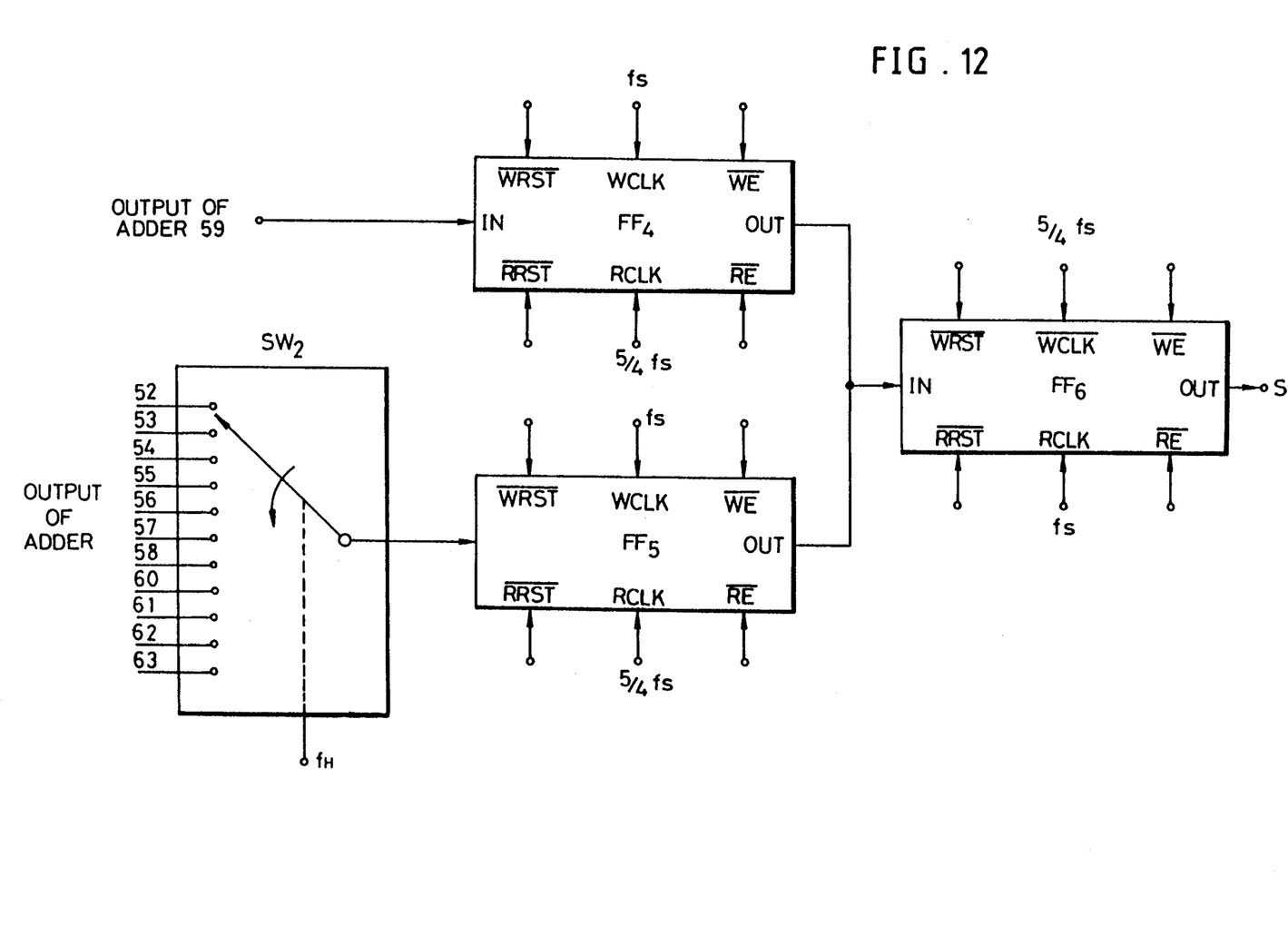
FIG. 12 is a circuit diagram showing an embodiment of a buffer corresponding to an interpolator of FIG. 11.
Figure 13A:
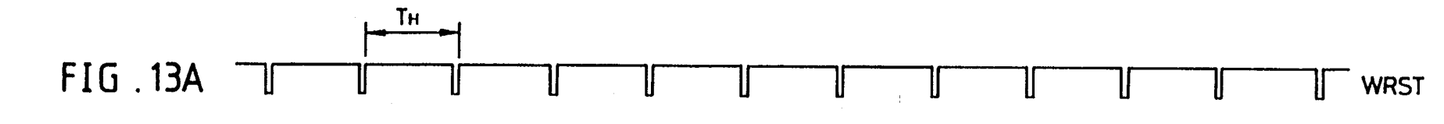
FIG. 13 is a timing chart explaining operation of a line memory shown in FIG. 12.
Figure 13B:
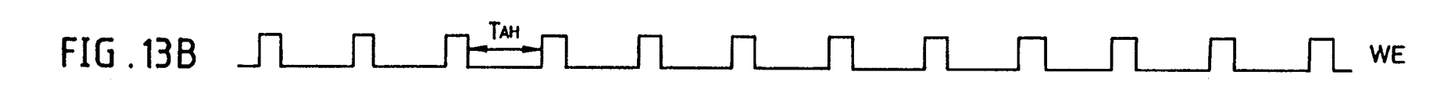

FIG. 12 shows an embodiment of a buffer corresponding to the interpolator shown in FIG. 11, where a switch $SW_2$ switches by a period of one-line scanning interval to select one signal among the output signals of the respective adders 52 to 63 in the interpolator shown in FIG. 11, and writes the selected signal in line memory $FF_5$ by the same way as in the timing charts shown in FIGS. 13A and 13B.

Also, an output signal of the adder 59, which is outputted with the output signal of the adder 58 at the same time, is written in line memory $FF_4$ by the same way as in the line memory $FF_5$.

Figure 13C:
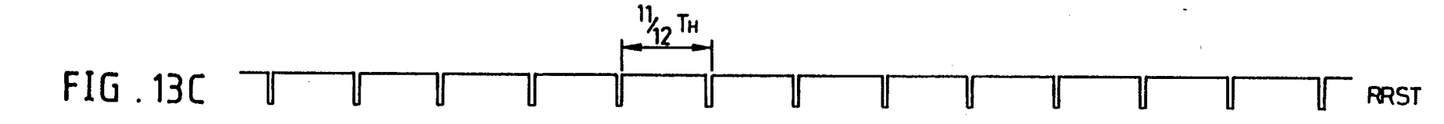
Figure 13D:
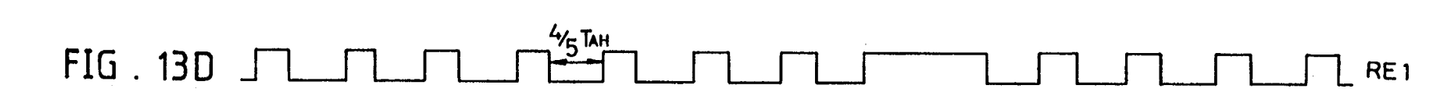
Figure 13E:
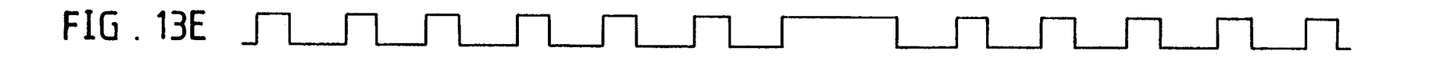
Figure 13F:
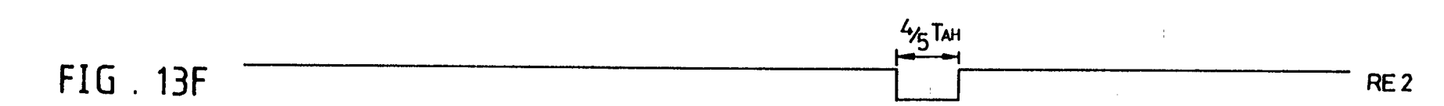
Figure 13G:
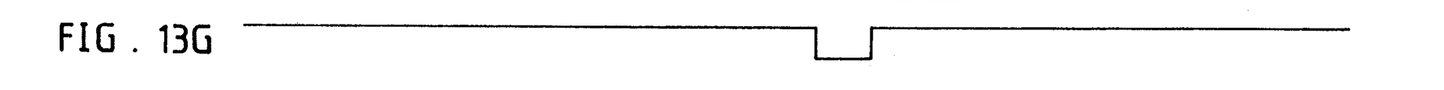

Meanwhile, the two line memories $FF_4$ and $FF_5$ are read-reset as shown in FIG. 13C, and between them, the read-enable of line memory $FF_5$ is performed as shown in FIG. 13B and the read-enable of line memory $FF_4$ is performed as shown in FIG. 13E.

Accordingly, even if the write clock of the line memories $FF_4$ and $FF_5$ are $f_s$ and the read clock is $(12/11) f_s$, no collision between read and written data is generated.

Figure 14A:
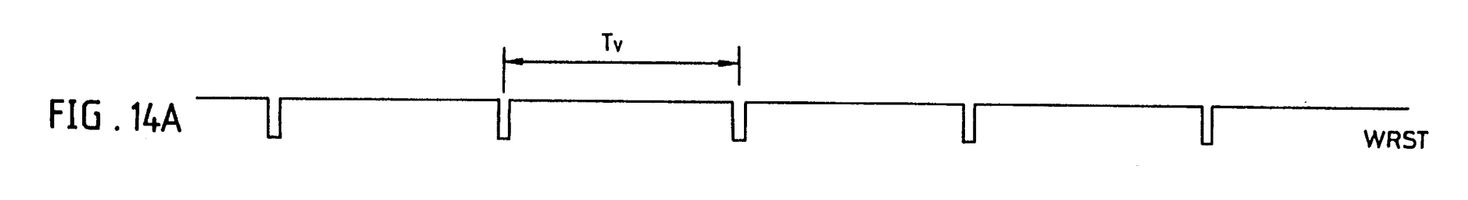
FIG. 14 is a timing chart explaining operation of a field memory shown in FIG. 12.
Figure 14B:
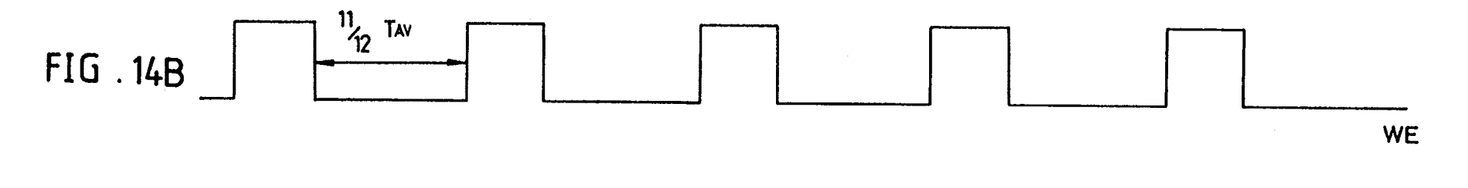

Meanwhile, since the write clock of field memory $FF_6$ is $(12/11)f_s$, which is the same as the read clock of line memories $FF_4$ and $FF_5$, Also, in the writing operation of field memory $FF_6$, as shown in FIG. 14A, a write reset pulse is generated by each vertical scanning interval $T_v$, and the write enable is performed as shown in FIG. 14B only for a number of active scanning lines, i.e., about 480 lines, interval 11/12 $T_{AV}$.

Figure 14C:
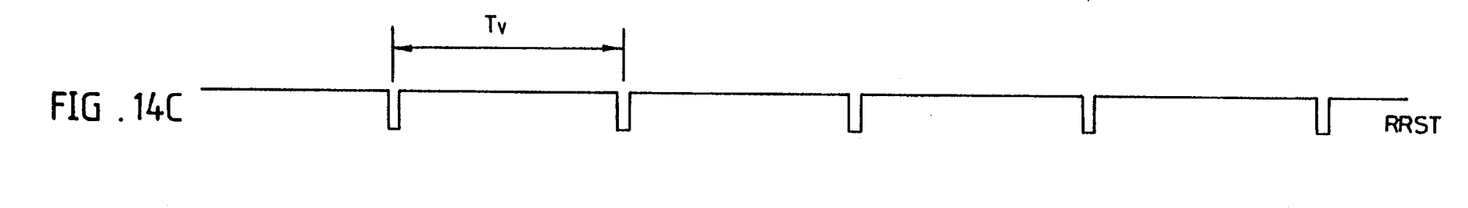
Figure 14D:
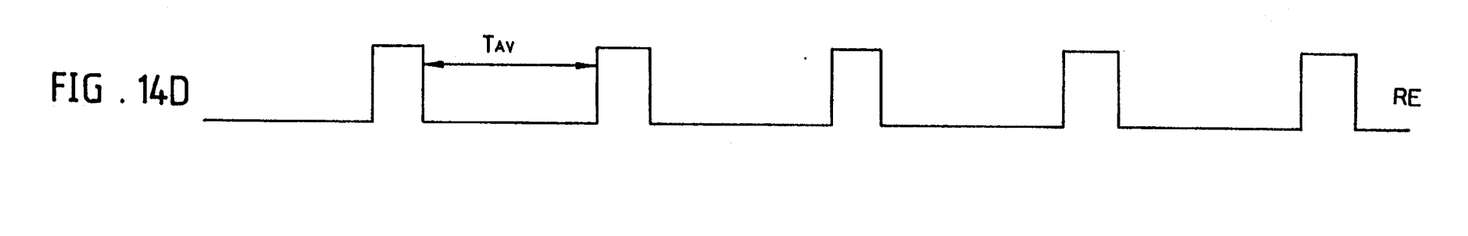

And, the read-reset is performed by being delayed by $T_v/2$ compared with the write-set, as shown in FIG. 14C, and its reading operation is enabled for the interval $T_{AV}$ as shown in FIG. 14D. Accordingly, the output image finally displayed on the 16:9 screen is horizontally expanded by about 14.6%, and has blackened-out side panels corresponding to 3.125% of the screen's horizontal width on the right and left sides of the screen.

Also, in a vertical direction, an image in which information corresponding to about 40 lines is removed from the 480 active scanning lines of an image having a 4:3 screen aspect ratio, is displayed. All control pulses (read-reset, read-enable, write-reset, and write-enable) used in each memory are generated from the window circuit 23 shown in FIG. 5.

As described above, the present invention removes upper and lower image portions having unimportant information in a vertical direction from a video signal having a 4:3 screen aspect ratio, and time-compresses the video signal in a horizontal direction to convert it into an image having a 5:3 screen aspect ratio, and than displays the video signal on a screen having a 16:9 screen aspect ratio, so that loss of screen information in a vertical direction is minimized and image expansion in a horizontal direction is reduced. Accordingly, there is an advantage of maintaining integrity of image after conversion. That is, an image converted by the present converting method has side panels corresponding to about 3.125% of the screen's horizontal width on the right and left sides of the screen and the image expansion rate in a horizontal direction is determined as 11% to 14.5% according to the aforementioned interpolation by an embodiment of the present invention, so that the general televiewer rarely perceives a variation of image, contrarily to the conventional conversion method.

Other embodiments in conversion into screens having other screen aspect ratios such that a video signal having a 4:3 screen aspect ratio is displayed on a screen having a 15:9 screen aspect ratio or a video signal having a 16:9 screen aspect ratio is displayed on a screen having a 4:3 screen aspect ratio, will be obvious to those skilled in the art, and these variations may be made within the scope of the invention defined by the appended claims.

What is claimed is:

1. A television screen aspect ratio converting device comprising:

window means for receiving horizontal and vertical synchronizing signals separated from an input video signal, extracting a predetermined number of active lines to be displayed on a screen having an aspect ratio of 16:9 from a vertically interpolated signal, and outputting a control signal for positioning an image having a screen aspect ratio of 5:3 in the middle of a screen having an aspect ratio of 16:9;

vertical interpolation means for vertically interpolating an input video signal having a screen aspect ratio of 4:3 by a predetermined ratio; and buffer means for time-compressing by a predetermined rate the video signal vertically interpolated by said vertical interpolation means and then outputting said interpolated video signal according to said control signal of said window means;

wherein said vertical interpolation means comprises:

a plurality of ROMs where a plurality of filter coefficients used in vertical interpolation are recorded;

a plurality of line memories for delaying by one line said input video signals; and a plurality of adders for adding multiplied outputs of said filter coefficients of said ROMs and said delayed signals, respectively, and outputting at the same time the respective added outputs.

2. A television screen aspect ratio converting device comprising:

window means for receiving horizontal and vertical synchronizing signals separated from an input video signal, extracting a predetermined number of active lines to be displayed on a screen having an aspect ratio of 16:9 from a vertically interpolated signal, and outputting a control signal for positioning an image having a screen aspect ratio of 5:3 in the middle of a screen having an aspect ratio of 16:9;

vertical interpolation means for vertically interpolating an input video signal having a screen aspect ratio of 4:3 by a predetermined ratio; and buffer means for time-compressing by a predetermined rate the video signal vertically interpolated by said vertical interpolation means and then outputting said interpolated video signal according to said control signal of said window means;

wherein said buffer means comprises:

a switch for selecting an output among a plurality of outputs of said vertical interpolation means by being switching-controlled with a horizontal frequency;

a plurality of line memories for writing and reading a signal selected by said switch and a part of outputs of said vertical interpolation means, and controlled so as not to generate collision between read and write data according to a control signal of said window means; and a field memory for receiving an output of said line memories and outputting a video signal horizontally expanded by a predetermined rate compared with output video signals of said line memories.

* * * * *